Dec. 10, 1968   H. LLOYD   3,415,911
FUEL ELEMENT FABRICATION
Filed Oct. 18, 1965

United States Patent Office 3,415,911
Patented Dec. 10, 1968

3,415,911
FUEL ELEMENT FABRICATION
Henry Lloyd, Wantage, England, assignor to United Kingdom Atomic Energy Authority, London, England
Filed Oct. 18, 1965, Ser. No. 497,469
Claims priority, application Great Britain, Nov. 16, 1964, 46,672/64
10 Claims. (Cl. 264—.5)

ABSTRACT OF THE DISCLOSURE

A method of fabricating nuclear fuel elements comprises the steps of loading bodies of ceramic nuclear fuel into a sheath and subsequently fracturing or cracking said bodies within said sheath. Preferably the fuel bodies are cylindrical and dimensioned to easily enter the sheath, the bodies being fractured or cracked by mechanical means, ultrasonic vibration or thermal shock.

---

This invention relates to fuel elements for nuclear reactors and is particularly concerned with the fabrication of elements in which a ceramic fuel is encased within a protective sheath.

Ceramic fuel elements are conventionally fabricated from sintered pellets or cast bars which are fitted into tubular metal cans or by vibro compacting selected particles of fuel into the cans. It is desirable that the fuel should make intimate contact with the interior of the can to ensure efficient heat transfer from the fuel during reactor operations.

In the case of pellets or bars difficulties can arise during loading into the can due to the narrow diametrical tolerances required on the fuel bodies and the bore of the can to ensure intimate contact since the close fit tends to reduce the rate of filling which can be attained. Even where the fuel bodies are ground and the cans produced to fine engineering tolerances at considerable expense, the resultant gap between the fuel and the can may vary between 0.0005 and 0.005 inch in the case of fuel pellets up to 0.4 inch diameter. Such variations in clearance greatly effect the ease of loading, the density of fuel in the can and the heat transfer from fuel to can.

Use of the vibro compacting method can also prove expensive as careful size grading of the fuel particles is necessary to achieve acceptable fuel densities in the can. Since the particles are produced from previously comminuted bulk fuel or granulated material prepared from fused or sintered powder, particle size control is difficult and a large proportion of the prepared fuel material, being outside the desired size grades for optimum vibro compaction, requires re-cycling before use.

The object of the present invention is to provide an improved method of fabricating sheathed ceramic fuel elements.

According to the invention a method of fabricating nuclear fuel elements comprises the steps of loading bodies of ceramic nuclear fuel into a sheath and subsequently fracturing or cracking said bodies within said sheath. It is apparent that the fuel bodies would be of a brittle nature and the can would be of a non-brittle nature (such as sheet metal, stainless steel, or the like) so that only the fuel bodies would fracture while the can would be kept intact.

Preferably the fuel bodies are cylindrical and dimensioned to easily enter the sheath, the bodies being fractured by ultrasonic vibration or thermal shock.

According to one aspect of the invention the fuel bodies have the form of annular pellets and an oversize rod is passed through the central aperture in the pellets to cause fracture of the pellets.

Cylindrical pellets may be formed with a nonsymmetrical central aperture, for example, a star shaped aperture such that upon fracturing, the pellets will crack other than diametrically.

To enable the nature of the invention to be more readily understood embodiments of the invention will now be described by way of example with reference to the accompanying drawings.

Figure 1:
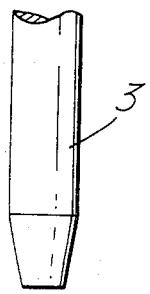
FIGURE 1 shows cross-sectional view of an annular pellet before fracture together with a mechanical element designed to pass into the aperture of the pellet to fracture the same.
Figure 3:
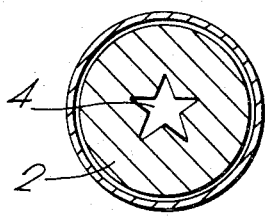
FIGURE 3 shows a pellet having a star-shaped central aperture.
Figure 4:
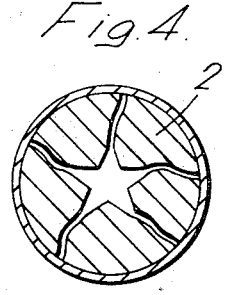
FIGURE 4 shows the pellet of FIGURE 3 after being fractured and expanded.
Figure 2:
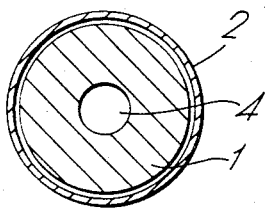
FIGURE 2 shows the pellet of FIGURE 1 after being fractured and expanded.
Figure 5:
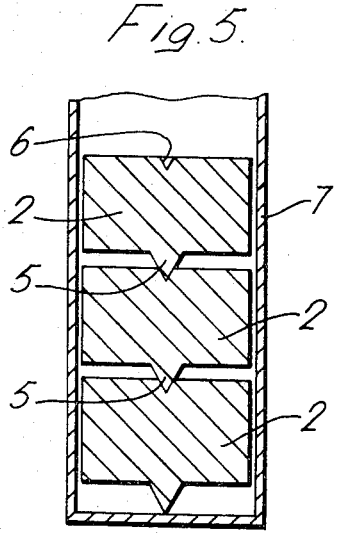
FIGURE 5 shows a sectional view of pellets in a fuel can illustrating an alternative method of fracture.

In the fabrication of a fuel element comprising $UO_2$ fuel pellets in a stainless steel can 1 the pellets 2 are formed as short cylinders 0.4 inch diameter and 0.4 inch long. The cans are 39 inches long and the diametrical tolerances on the pellets and cans are such as to permit a gap between a pellet and can of between 0.005 and 0.010 inch. Such clearances permit easy loading of the can and speeds up the rate of loading.

After loading the pellets are subject to ultrasonic vibration such that the pellets fracture in the can. Measurements have shown that when high density fuel pellets are used an overall fuel density in the can of up to 91% of the theoretical density is possible and efficient heat transfer between the fuel and the can can be achieved.

The pellets may also be fractured by subjecting a loaded fuel element to thermal shock, i.e. rapid changes in temperature, for example, by heating and quenching. Alternatively the fuel pellets may be allowed to fracture after the fuel element has been loaded into a nuclear reactor the initial reactor operation being arranged to cause fracture of the pellet.

The pellets may have various forms, for example, annular pellets may be used and an oversized rod or wire 3 drawn through the central aperture 4 in the pellets to cause fracture after loading into the can. Since it is considered desirable that the pellets should not fracture or crack diametrically, the central aperture in a fuel pellet may be non symmetrical in cross-section i.e. the aperture may be star shaped having an uneven number of points or rays.

In another configuration the pellets 2 are cylindrical and provided with a central projecting member 5 on one end surface with a corresponding but smaller dimple 6 on the other end surface, such that when stacked in a column within a can 7, an applied axial force would tend to push the projecting member into the dimple causing fracture of each pellet. The projecting member may be pyramidal.

It will be further appreciated that the relatively wide tolerances that may be used on the fuel bodies and can dimensions permit the use of unground bodies, for example, pellets or bars since these can be produced with sufficient dimensional accuracy using conventional extrusion or casting techniques and the relaxation of tolerances also leads to cheaper cans and can closure components.

The economic advantages of the invention also include the elimination of grinding swarf, swarf recycling and the minimisation of inspection and rejection at the can loading stage.

In a further application of the invention, bars of a ceramic fuel material, such as $UO_2$ or $UC$ may be extruded, sintered and inserted in a can and subsequently fractured by a shock or pull through technique if hollow bars are used. It has been found that by providing refractory metal supports for the rods during sintering the "as sintered fuel rod" is acceptable for insertion into a can and that the fracturing ensures fuel contact with the can. The use of long rods of ceramic fuel cut to a precise length has the added advantage of avoiding problems associated with chipped pellets, and the effect of fission gas release in causing circumferential ridges adjacent the pellet interfaces.

I claim:

1. A method of fabricating a nuclear fuel element comprising the step of:
   loading a brittle ceramic nuclear fuel body into a tubular non-brittle sheath and subsequently fracturing said fuel body to increase the cross-section dimensions of the body relative to the sheath.

2. A method of fabricating a nuclear fuel element according to claim 1 wherein the fuel body is fractured into a multiplicity of portions, the fractures extending generally in a radial direction relative to the longitudinal axis of the fuel element and the said body portions moving outwardly to contact the sheath.

3. A method of fabricating a nuclear fuel element according to claim 2 wherein the fuel body is annular and the step of fracturing is accomplished by passing an oversize rod through the central aperture.

4. A method of fabricating a nuclear fuel element according to claim 3 wherein a plurality of said bodies are arranged in columnar form with the sheath.

5. A method of fabricating a nuclear fuel element according to claim 2 wherein the fuel body is in the form of a hollow cylinder having a non-symmetrical central aperture and the step of fracturing is accomplished by passing an oversize rod through said aperture.

6. A method of fabricating a nuclear fuel element according to claim 5 wherein the central aperture is star-shaped, the said star having an uneven number of points.

7. A method of fabricating a nuclear fuel element according to claim 2 wherein the fuel body comprises a plurality of fuel bodies, each in the form of a generally cylindrical pellet, each pellet having a projecting member on one end surface and a corresponding smaller dimple on the other end surface and wherein a plurality of said pellets are stacked in a column in said sheath and the said step of fracturing is accomplished by applying an axial force such that the projecting member on each pellet is pushed into the dimple of an adjacent pellet to fracture said pellet.

8. A method of fabricating a nuclear fuel element according to claim 7 wherein the said projecting member is pyramidal.

9. A method of fabricating a nuclear fuel element according to claim 2 wherein the body is fractured by subjecting the sheathed body to thermal shock.

10. A method of fabricating a nuclear fuel element according to claim 2 wherein the body is fractured by subjecting the sheathed body to ultrasonic vibrations.

References Cited

UNITED STATES PATENTS

| | | | |
|---|---|---|---|
| 1,913,355 | 6/1933 | Wiegand | 29—155.66 |
| 3,017,688 | 1/1962 | Cummings et al. | 29—155.66 |
| 3,129,140 | 4/1964 | Stohr et al. | 176—73 |
| 3,168,371 | 2/1965 | Pierre et al. | 264—.5 |
| 3,222,124 | 12/1965 | Anderson et al. | 23—324 |
| 3,260,466 | 7/1966 | Wagner et al. | 176—91 |

BENJAMIN R. PADGETT, *Primary Examiner.*

U.S. Cl. X.R.

176—73, 76, 90; 29—400, 445